United States Patent
Lee et al.

(10) Patent No.: US 12,367,889 B2
(45) Date of Patent: Jul. 22, 2025

(54) METHOD AND APPARATUS FOR TRANSMITTING/RECEIVING VOICE SIGNAL ON BASIS OF ARTIFICIAL NEURAL NETWORK

(71) Applicant: Samsung Electronics Co., Ltd., Suwon-si (KR)

(72) Inventors: Hakju Lee, Suwon-si (KR); Jihwan Woo, Suwon-si (KR); Kyunghun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 17/757,919

(22) PCT Filed: Nov. 11, 2020

(86) PCT No.: PCT/KR2020/015721
§ 371 (c)(1),
(2) Date: Jun. 23, 2022

(87) PCT Pub. No.: WO2021/132877
PCT Pub. Date: Jul. 1, 2021

(65) Prior Publication Data
US 2023/0036087 A1    Feb. 2, 2023

(30) Foreign Application Priority Data
Dec. 27, 2019 (KR) .................. 10-2019-0176561

(51) Int. Cl.
*G10L 19/26* (2013.01)
*G06N 3/08* (2023.01)
*H04W 28/06* (2009.01)

(52) U.S. Cl.
CPC ............... *G10L 19/26* (2013.01); *G06N 3/08* (2013.01); *H04W 28/06* (2013.01)

(58) Field of Classification Search
None
See application file for complete search history.

(56) References Cited

U.S. PATENT DOCUMENTS

| | | |
|---|---|---|
| 8,352,258 B2 | 1/2013 | Yamanashi et al. |
| 8,396,716 B2 | 3/2013 | Qi et al. |

(Continued)

FOREIGN PATENT DOCUMENTS

| | | | |
|---|---|---|---|
| JP | 2005110018 A | * | 4/2005 |
| KR | 10-2009-0087920 A | | 8/2009 |

(Continued)

OTHER PUBLICATIONS

International Search Report and Written Opinion of the International Searching Authority dated Jan. 29, 2021, in connection with International Application No. PCT/KR2020/015721, 10 pages.

(Continued)

*Primary Examiner* — Adolf Dsouza

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Method and apparatus for transmitting/receiving a voice signal based on an artificial neural network are disclosed. A method of a transmission terminal transmitting a voice signal comprises the steps of: transmitting, to a reception terminal, neural network structure information related to the transmission terminal; generating a wideband signal on the basis of an inputted voice; generating a (Continued)

narrowband signal by down-sampling the wideband signal; and transmitting the narrowband signal to the reception terminal.

16 Claims, 15 Drawing Sheets

(56) References Cited

U.S. PATENT DOCUMENTS

| | | | |
|---|---|---|---|
| 9,760,827 | B1* | 9/2017 | Lin .................... G06N 3/08 |
| 2005/0267739 | A1 | 12/2005 | Kontio et al. |
| 2012/0065967 | A1 | 3/2012 | Ohkawa |
| 2015/0317998 | A1 | 11/2015 | Lee et al. |
| 2017/0346954 | A1 | 11/2017 | Wang et al. |
| 2018/0358003 | A1 | 12/2018 | Calle et al. |
| 2019/0370631 | A1* | 12/2019 | Fais .................... G06F 8/41 |

FOREIGN PATENT DOCUMENTS

| | | |
|---|---|---|
| KR | 10-2015-0126214 A | 11/2015 |
| KR | 10-2017-0052090 A | 5/2017 |
| KR | 10-20190-001278 A | 1/2019 |
| KR | 10-2019-0019688 A | 2/2019 |
| WO | 2018150083 A1 | 8/2018 |

OTHER PUBLICATIONS

Supplementary European Search Report dated Nov. 30, 2022, in connection with European Application No. 20905098.8, 12 pages.
Office Action dated Feb. 13, 2022, in connection with Korean Application No. 10-2019-0176561, 12 pages.
Kuleshov, et al., "Audio Super-Resolution Using Neural Nets," arXiv:1708.00853v1 [cs.SD], Aug. 2017, 8 pages.

* cited by examiner

METHOD AND APPARATUS FOR TRANSMITTING/RECEIVING VOICE SIGNAL ON BASIS OF ARTIFICIAL NEURAL NETWORK

CROSS-REFERENCE TO RELATED APPLICATIONS

This application is a 371 National Stage of International Application No. PCT/KR2020/015721, filed Nov. 11, 2020, which claims priority to Korean Patent Application No. 10-2019-0176561, filed Dec. 27, 2019, the disclosures of which are herein incorporated by reference in their entirety.

BACKGROUND

1. Field

The disclosure relates to a method of expanding a bandwidth of a voice signal through artificial neural network structure signaling and an apparatus supporting the same.

2. Description of Related Art

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system. In order to achieve a high data transfer rate, an implementation of the 5G communication system in a mmWave band (e.g., 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system. In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, technologies, such as a sensor network, machine to machine (M2M) and machine type communication (MTC), are implemented by schemes, such as beamforming, MIMO, and an array antenna, that is, 5G communication technologies. The application of a cloud radio access network (cloud RAN) as the aforementioned big data processing technology may be said to be an example of convergence between the 5G technology and the IoT technology.

Meanwhile, if voice signals are transmitted and received between terminals as in a voice call in a wireless communication system, a voice inputted to a transmission terminal is converted into a wideband signal having an electrical form within the transmission terminal. The transmission terminal converts the wideband signal into a narrowband signal due to restrictions on a transmission bandwidth, and transmits the signal to a reception terminal. To this end, the transmission terminal converts the wideband signal into the narrowband signal through down-sampling processing, and transmits the narrowband signal to the reception terminal. The reception terminal that has received the narrowband signal restores the narrowband signal to the wideband signal through up-sampling (bandwidth expansion) processing, and outputs the voice based on the restored wideband signal.

SUMMARY

In the case of the aforementioned voice signal transmission and reception technology, incomplete restoration is inevitably performed because a reception terminal has to restore the original waveform based on some sampled data in the state in which the reception terminal is unaware of a wideband signal generated by a transmission terminal. This directly boils down to the deterioration of voice quality. Accordingly, an efficient bandwidth expansion technology is required.

The disclosure proposes a technology for effectively restoring, by a reception terminal, a narrowband signal received from a transmission terminal to an original wideband signal by using an artificial neural network learnt based on the wideband signal and the narrowband signal down-sampled from the wideband signal.

A method of a transmission terminal transmitting a voice signal according to an embodiment of the disclosure for achieving the aforementioned technology object may include transmitting, to a reception terminal, neural network structure information related to the transmission terminal, generating a wideband signal based on inputted voice, generating a narrowband signal by down-sampling the wideband signal, and transmitting the narrowband signal to the reception terminal.

Furthermore, a method of a reception terminal receiving a voice signal according to an embodiment of the disclosure may include receiving neural network coefficient information from a server, receiving a narrowband signal and neural network structure information from a transmission terminal, restoring an artificial neural network based on the neural network coefficient information and the neural network structure information, and converting the narrowband signal into a wideband signal based on the restored artificial neural network.

Furthermore, a method of a server communicating with a terminal transmitting and receiving voice signals according to an embodiment of the disclosure may include receiving one or more of a wideband signal and a narrowband signal from a transmission terminal, performing learning of an artificial neural network based on the wideband signal and the narrowband signal, generating neural network coefficient information related to the learnt artificial neural network, and transmitting the neural network coefficient information to a reception terminal.

A bandwidth expansion method based on an artificial neural network, which enables a narrowband signal to be effectively restored to a wideband signal based on an artificial neural network, is disclosed.

DETAILED DESCRIPTION

Figure 1:
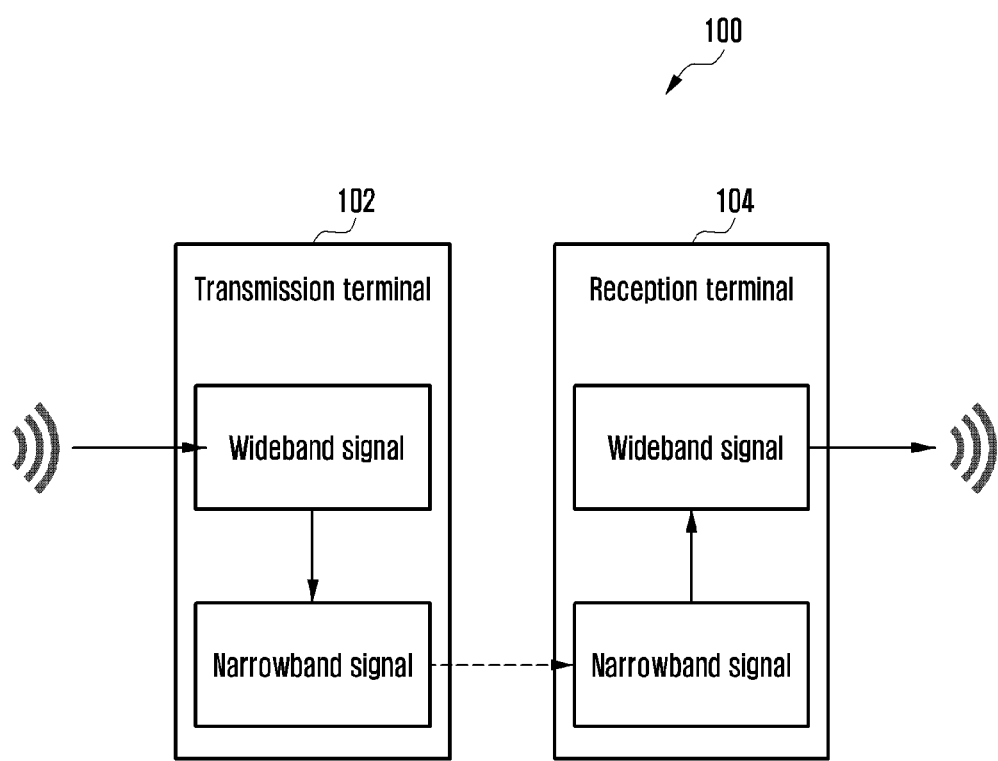
FIG. 1 is a diagram illustrating a process between the transmission and reception of voice signals between terminals within a communication system.

Hereinafter, embodiments of the disclosure are described in detail with reference to the accompanying drawings. In describing the embodiments, a description of technology contents that are well known in the art to which the disclosure pertains and that are not directly related to the disclosure is omitted in order to clearly deliver the gist of the disclosure without obscuring the gist of the disclosure by omitting an unnecessary description.

For the same reason, in the accompanying drawings, some components are enlarged, omitted or schematically depicted. Furthermore, the size of each component does not accurately reflect its real size. In the drawings, the same or similar components are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same components.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable storage medium that can direct a computer or other programmable data processing equipment to implement a function in a particular manner, such that the instructions stored in the computer-usable or computer-readable memory produce an article of manufacture including instruction means that implement the function specified in the flowchart block(s). The computer program instructions may also be loaded on a computer or other programmable data processing equipment to cause a series of operational steps to be performed on the computer or other programmable data processing equipment to produce a computer-executed process, so that the instructions performing the computer or other programmable data processing equipment provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the present embodiment means software or a hardware component, such as an FPGA or an ASIC, and the "unit" performs specific tasks. However, the term "unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card. Furthermore, in embodiments, '~unit' may include one or more processors.

A term to denote a signal, a term to denote a channel, a term to denote control information, terms to denote network entities, a term to denote a component of an apparatus, a term for identifying an access node, terms to denote messages, a term to denote an interface between network entities, terms to denote various types of identification information, etc., which are used in the following description, have been exemplified for convenience of description. Accordingly, the disclosure is not limited to terms described later, and another term to denote a target having an equivalent technical meaning may be used.

FIG. 1 is a diagram illustrating an example of a process between the transmission and reception of voice signals between terminals according to an embodiment of the disclosure.

FIG. 1 illustrates an example of the transmission and reception of voice signals between a terminal (hereinafter a transmission terminal or a first terminal) 102 transmitting a voice signal and a terminal (hereinafter a reception terminal or a second terminal) 104 receiving a voice signal according to an embodiment of the disclosure.

With reference to FIG. 1, a voice inputted to the transmission terminal 102 may be converted into an electrical voice signal within the transmission terminal 102, and may be delivered to the reception terminal 104 as an analog signal or a digital signal. In this case, the voice inputted to the transmission terminal 102 is converted into the wideband signal having a wide bandwidth within the transmission terminal 102, but the signal transmitted to the reception terminal 104 may be transmitted after being converted in the form of the narrowband signal due to restrictions on a transmission bandwidth. To this end, the transmission terminal 102 may convert, into the narrowband signal, the wideband signal generated based on the inputted voice through down-sampling processing, and may transmit the narrowband signal to the reception terminal 104. The reception terminal 104 that has received the narrowband signal may restore the narrowband signal to the wideband signal through up-sampling (bandwidth expansion) processing, and may output a voice based on the restored wideband signal.

Figure 2:
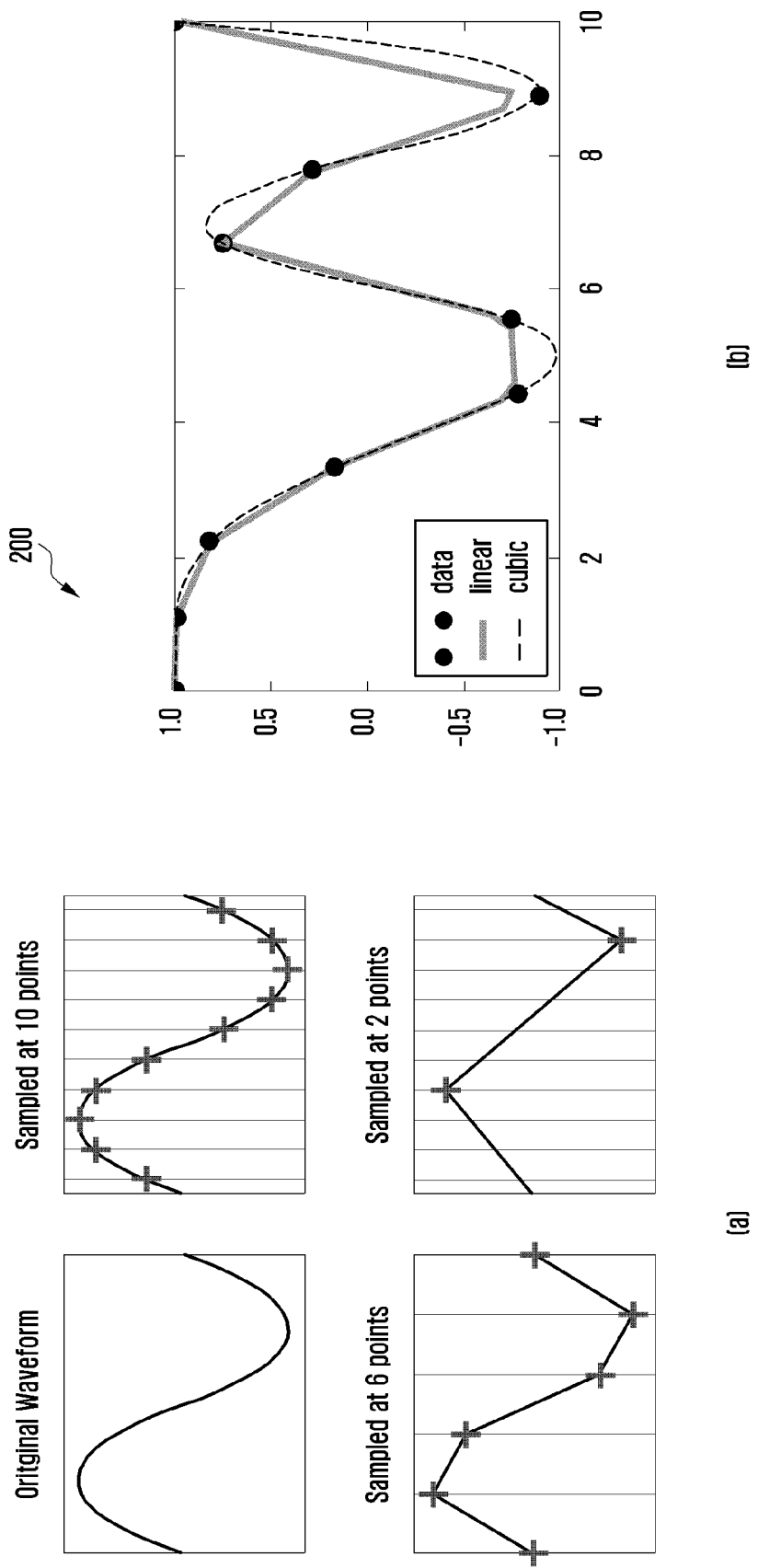
FIG. 2 is a diagram illustrating an example of down-sampling processing which converts a wideband voice signal into a narrowband voice signal.

FIG. 2 is a diagram illustrating an example of down-sampling and up-sampling processing for a voice signal.

With reference to FIG. 2, the transmission terminal 102 may generate an electrical voice signal based on an inputted voice. In this case, an original waveform of the voice signal generated by the transmission terminal 102 may be generated as a wideband signal including a large amount of data. The transmission terminal 102 may convert the wideband signal into a narrowband signal through down-sampling processing for sampling some data of the original waveform, and may transmit the converted narrowband signal to the reception terminal 104. The reception terminal 104 may restore the received narrowband signal to the wideband signal (original waveform) through linear or cubic spline interpolation. In this case, incomplete restoration is performed because the reception terminal 104 has to restore the original waveform based on some sampled data in the state in which the reception terminal 104 is unaware of the wideband signal (original waveform) generated by the transmission terminal 102. This directly boils down to the deterioration of voice quality.

The disclosure discloses a method of expanding the bandwidth of a voice signal based on an artificial neural network learnt based on a wideband signal and a narrowband signal.

Hereinafter, a method of expanding the bandwidth of a voice signal in a reception terminal through artificial neural network structure signaling according to an embodiment of the disclosure is described with reference to drawings.

Figure 3:
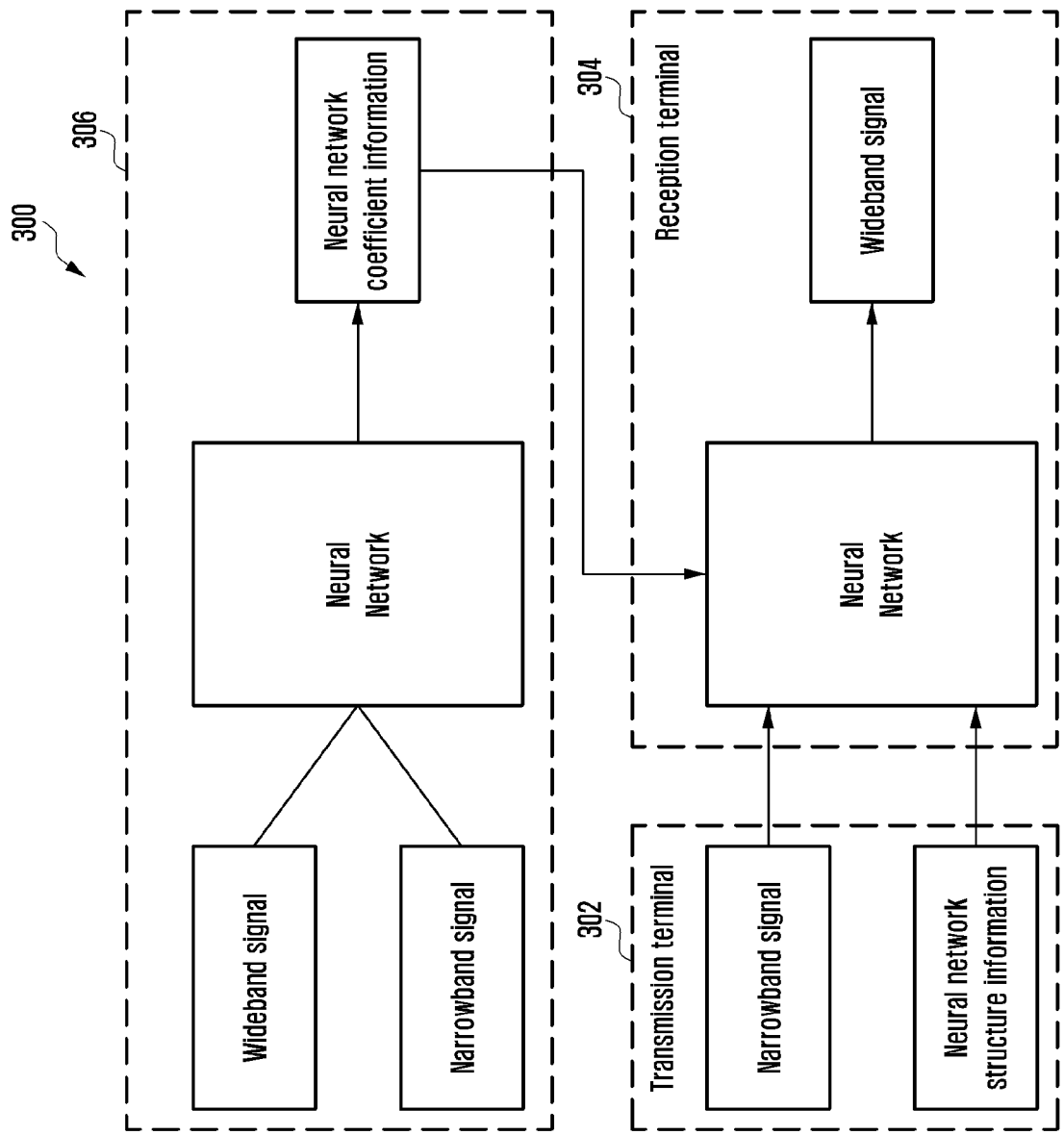
FIG. 3 is a diagram illustrating a bandwidth expansion method based on an artificial neural network according to an embodiment of the disclosure.

FIG. 3 is a diagram illustrating a bandwidth expansion method based on an artificial neural network according to an embodiment of the disclosure.

With reference to FIG. 3. the bandwidth expansion method based on an artificial neural network according to an embodiment of the disclosure may be performed by a system including a transmission terminal 302 transmitting a voice signal, a reception terminal 304 receiving a voice signal, and a server 306. Hereinafter, in this specification, an artificial neural network learning process will be described as being performed by the separate server 306 for convenience of description, but this does not limit the scope of the disclosure. The artificial neural network learning process may be implemented by any apparatus capable of implementing each of steps performed by the server 306 to be described later, for example, a terminal.

According to an embodiment, the server 306 may perform the learning of an artificial neural network by using, as learning data, a wideband signal and a narrowband signal generated by down-sampling the wideband signal. The learning data for the learning may be transmitted from the transmission terminal 302 to the server 306. According to an embodiment, the transmission terminal 302 may transmit, to the server 306, the wideband signal and the narrowband signal generated by down-sampling the wideband signal. The server 306 may perform the learning of the artificial neural network based on the received wideband signal and narrowband signal. Alternatively, the transmission terminal 302 may transmit only the wideband signal to the server 306. The server 306 may generate the narrowband signal by down-sampling the received wideband signal, and may perform the learning of the artificial neural network based on the received wideband signal and the generated narrowband signal. That is, the server 306 may perform the learning of the artificial neural network by updating coefficients included in the artificial neural network so that the wideband signal corresponding to an original waveform of the narrowband signal is restored from the down-sampled narrowband signal and outputted. According to an embodiment, the server 306 may perform the learning of an artificial neural network by using frequency components (amplitude, a phase) of a narrowband signal and a wideband signal as learning data in addition to a change in the waveforms of the narrowband signal and the wideband signal for the time. In this case, the learning data used may be constructed in the form of (the waveform of the narrowband signal over time, the frequency component of the narrowband signal, the waveform of the wideband signal over time, or the frequency component of the wideband signal), for example, or may be constructed in the form of 2D data based on a change in the frequency (an x axis: time, a y axis: the amount of change of a frequency) of the narrowband signal and wideband signal over time. According to an embodiment, the server 306 may perform the learning of an artificial neural network by using a wideband signal and a narrowband signal as learning data based on neural network structure information related to the transmission terminal 302. The neural network structure information related to the transmission terminal 302 may be received by the server 306 from the transmission terminal 302 or may be previously stored in the server 306 in accordance with the transmission terminal 302. Neural network structure information according to an embodiment may include at least one of the number of layers constituting an artificial neural network, the number of filters for each layer, the sizes of filters for each layer, an activation function, a stride, and padding. The detailed definition of each of parameters included in the neural network structure information is described in detail below.

According to an embodiment, the server 306 may generate neural network coefficient information related to a learnt artificial neural network. The neural network coefficient information is a set of coefficients that constitute the learnt artificial neural network, and may be a set including values that constitute weights of filters within each layer of the artificial neural network to be described later, for example. The server 306 may transmit the generated neural network coefficient information to the reception terminal 304. The reception terminal 304 may store the received neural network coefficient information in a storage device (e.g., a memory) of the reception terminal 304.

According to an embodiment, the transmission of the neural network coefficient information from the server 306 to the reception terminal 304 and the storage of the neural network coefficient information in the reception terminal 304 accordingly may be performed before session negotiations between the transmission terminal 302 and the reception terminal 304 are performed. That is, since the information on the coefficients that constitute the learnt artificial neural network has a huge capacity and requires security, the information may be previously delivered and stored in the reception terminal 304 prior to session negotiations between the transmission terminal 302 and the reception terminal 304.

Thereafter, in the session negotiations and voice signal transmission and reception step, the transmission terminal 302 may transmit, to the reception terminal 304, neural network structure information, including parameters related to a structure of the learnt artificial neural network, and a narrowband signal down-sampled from a wideband signal generated based on a voice inputted to the transmission terminal 302.

Neural network structure information according to an embodiment of the disclosure may include at least one of the number of layers constituting an artificial neural network, the number of filters for each layer, the sizes of filters for each layer, an activation function, a stride, and padding. The number of layers L may indicate the total number of layers that constitute an artificial neural network. The number of filters (N_filters) and the sizes of filters (N_filtersizes) for each layer may indicate the number of filters included in each layer that constitutes an artificial neural network and the sizes of filters included in the each layer. The activation function may indicate the type of activation function corresponding to each layer within an artificial neural network, and may include any one of a sigmoid function, an Relu function, and a Leaky Relu function. The stride may indicate a sampling stride at which filtering for input data is applied within each layer. The padding may mean an indicator indicating whether padding will be applied to data inputted to each layer.

The reception terminal 304 may restore an artificial neural network learnt by the server 306, based on neural network structure information received from the transmission terminal 302 and previously stored neural network coefficient information. That is, the reception terminal 304 may restore the entire artificial neural network by configuring, in an artificial neural network structure corresponding to the neural network structure information received from the transmission terminal 302, coefficients included in the previously stored neural network coefficient information. As described above, the artificial neural network has been learnt to restore a wideband signal, that is, an original waveform of a narrowband signal, from the narrowband signal that has been down-sampled. Accordingly, the reception terminal 304 may restore, to a wideband signal, a narrowband signal received from the transmission terminal 302 by using an artificial neural network.

Hereinafter, the definition of parameters included in neural network structure information is described along with a structure and learning process of an artificial neural network according to an embodiment of the disclosure with reference to FIGS. 4 to 7.

Hereinafter, a description will be given by using a convolutional neural network as an example of an artificial neural network with reference to drawings, but this does not limit the scope of a right of the disclosure, and a bandwidth expansion method using any form of an artificial neural network, which may be implemented by a person having ordinary knowledge in the art to which the disclosure pertains based on the technical spirit of the disclosure, may be performed. Furthermore, hereinafter, a description will be given by taking a learning process of two-dimensional data using an artificial neural network as an example in the drawings, but this does not limit the scope of a right of the disclosure, and the learning of an artificial neural network using any form of data including one-dimensional or three-dimensional data depending on a form of data that needs to be learnt, which may be implemented by a person having ordinary knowledge in the art to which the disclosure pertains based on the technical spirit of the disclosure, may be performed.

Figure 4:
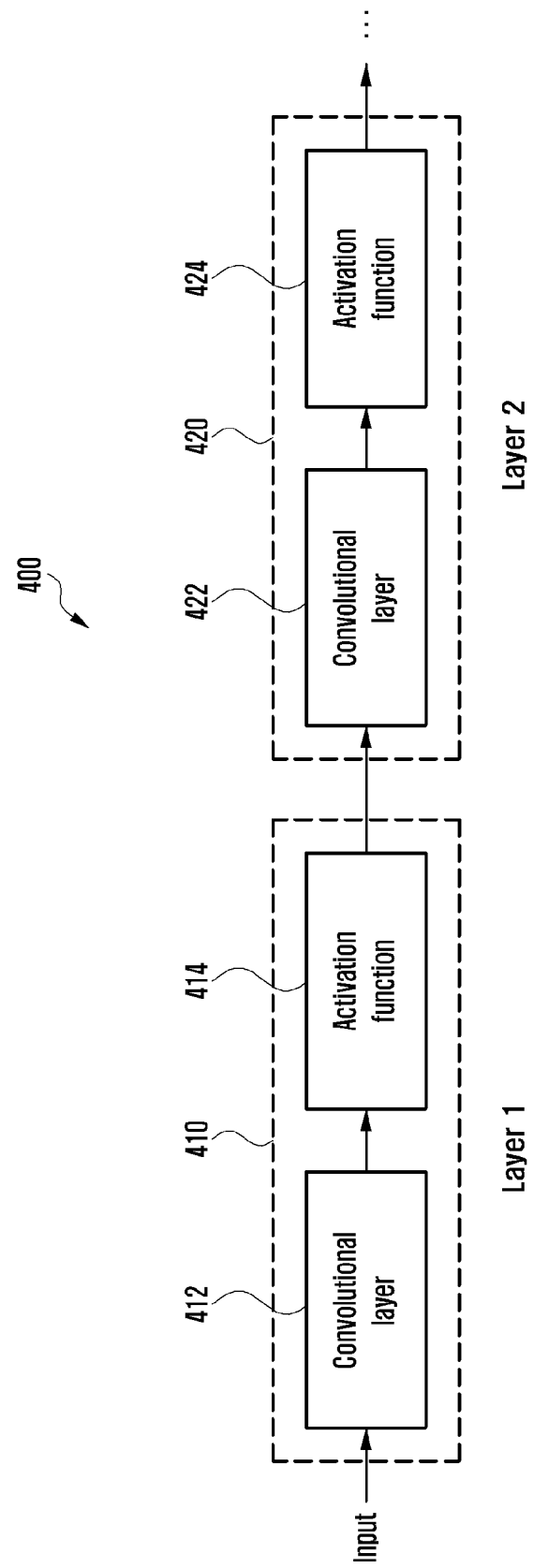
FIG. 4 is a diagram illustrating an example of a structure of an artificial neural network according to an embodiment of the disclosure.

FIG. 4 is a diagram illustrating an example of a structure of an artificial neural network according to an embodiment of the disclosure.

With reference to FIG. 4, the artificial neural network according to an embodiment of the disclosure may include a plurality of layers 410 and 420. The layers may include respective convolutional layers 412 and 422, which learn a weight based on input data, and respective activation functions 414 and 424. As illustrated in FIG. 4, data (input) inputted to Layer 1 410 may be subjected to filtering processing through a filter to which a given weight has been assigned in the convolutional layer 412, and is made to pass through the activation function. The data outputted by the convolutional layer may be converted into non-linear data and then delivered to Layer 2 420. Layer 2 may process data by using the same method as that in Layer 1 based on the data received from Layer 1, may deliver output data to a next layer (Layer 3). The last layer (Layer N) may output the final result value by repeating such a process. According to an embodiment, in the artificial neural network learning step, the artificial neural network having the structure may update weights of the filters within each layer in a way to output a proper (desired) output value in accordance with given input data. According to an embodiment of the disclosure, the artificial neural network may perform learning by using a narrowband signal and a wideband signal as learning data in a way to output the wideband signal, that is, an original waveform of the narrowband signal, from the narrowband signal that has been down-sampled.

According to an embodiment, the activation function within each layer may include a sigmoid function, an Relu function, and a Leaky Relu function or any non-linear function, for example.

the sigmoid function:

$$\sigma(x) = \frac{1}{1+e^{-x}}$$

the Relu function: max (0, x)
the Leaky Relu function: max(ax, x) where a<<1

According to an embodiment, the total number of layers within the artificial neural network illustrated in FIG. 4 may be indicated by the number of layers L included in neural network structure information. An activation function type corresponding to each layer may be indicated as an activation function included in neural network structure information.

Figure 5:
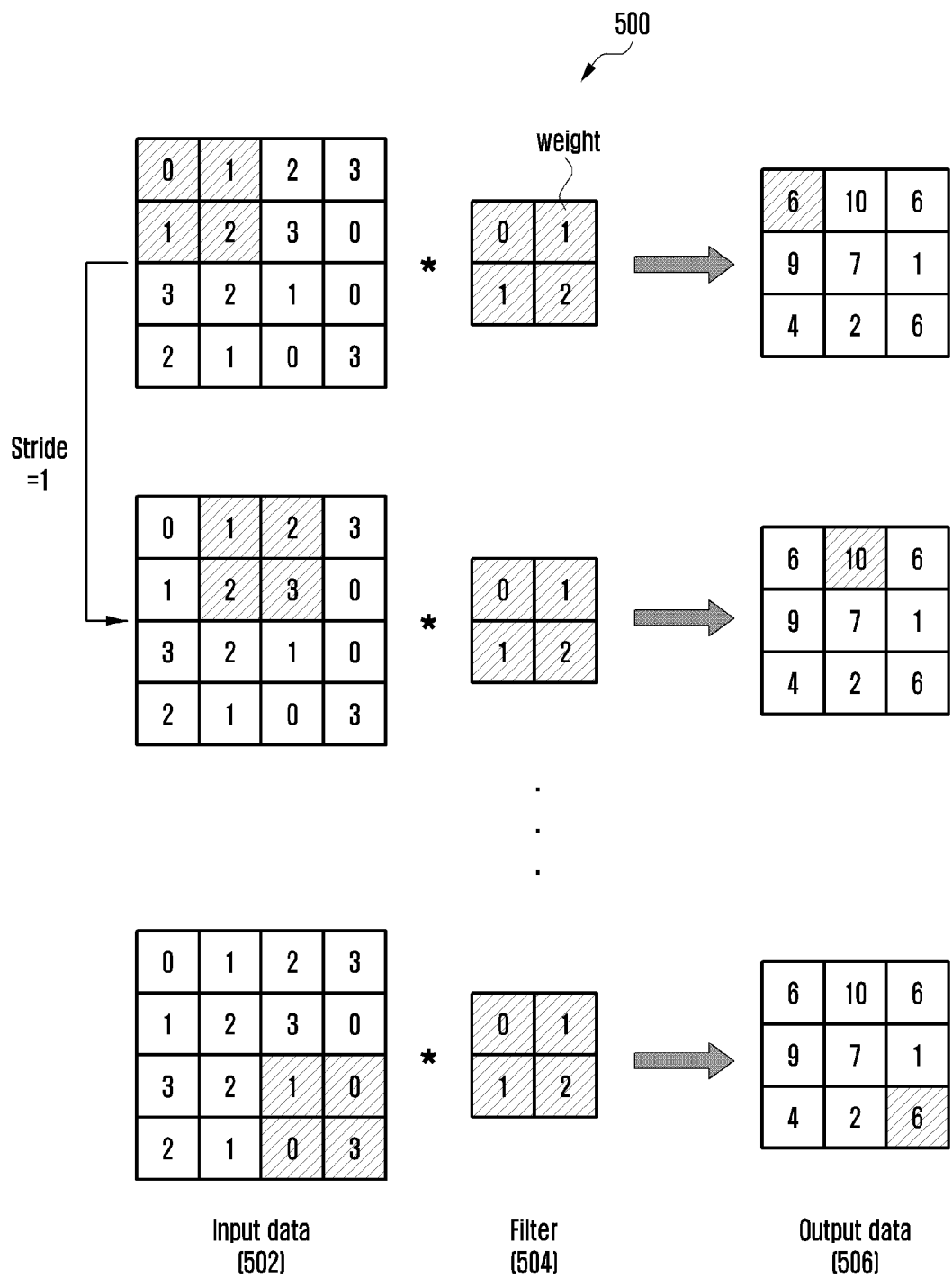
FIG. 5 is a diagram illustrating data filtering within a layer of an artificial neural network according to an embodiment of the disclosure.
Figure 6:
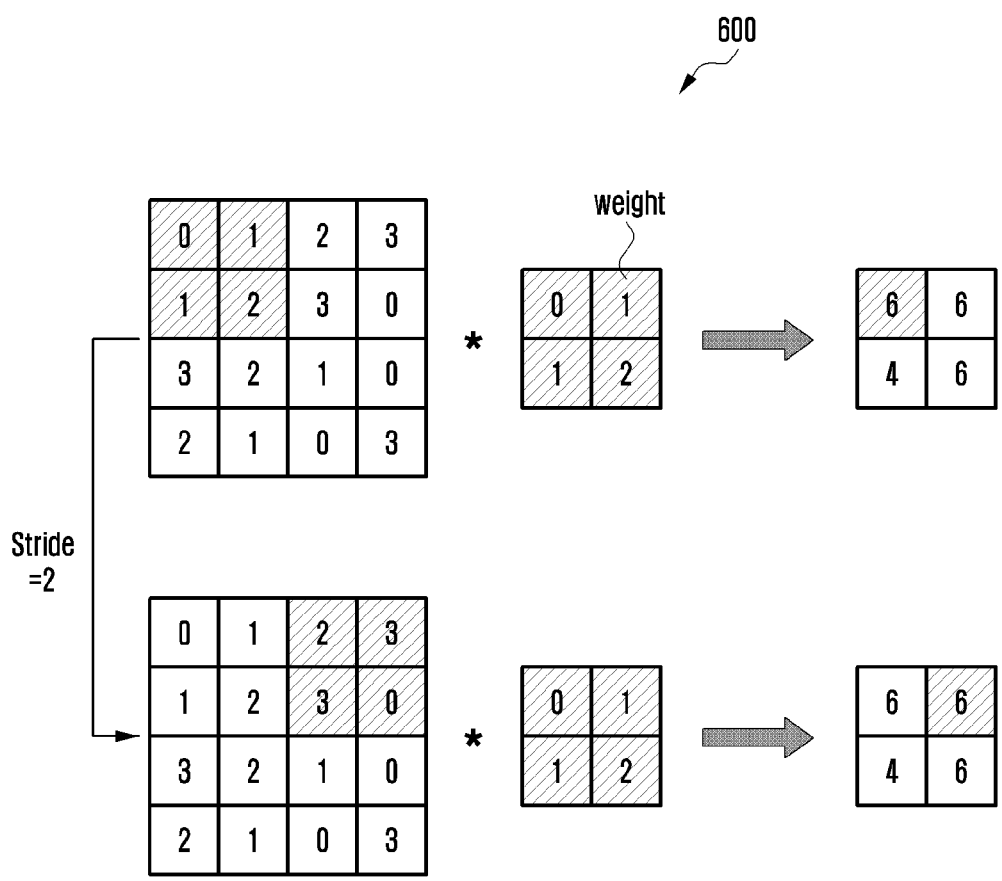
FIG. 6 is a diagram illustrating data filtering within a layer of an artificial neural network according to another embodiment of the disclosure.
Figure 7:
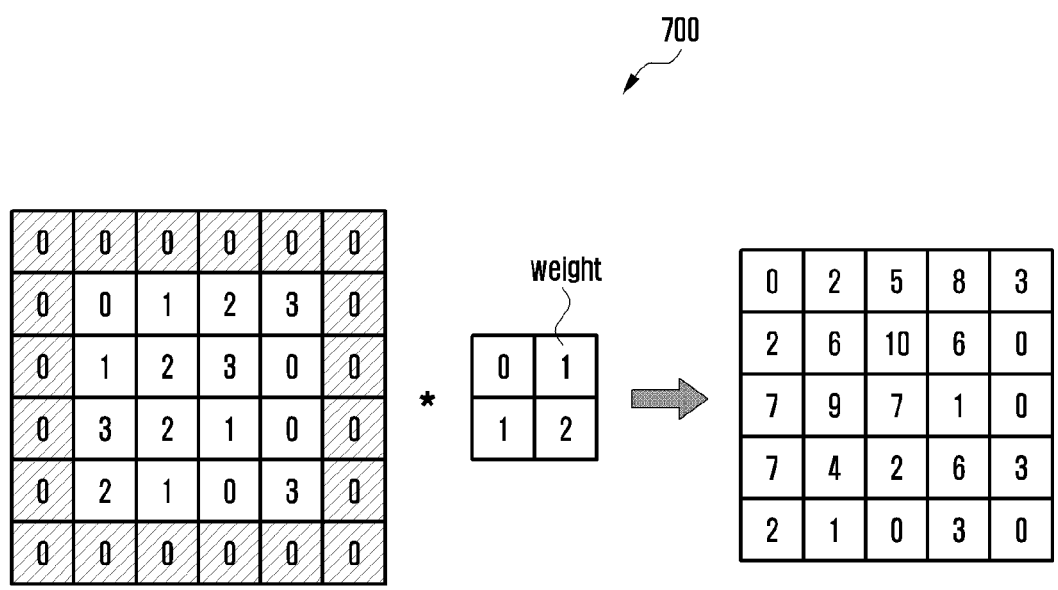
FIG. 7 is a diagram illustrating data filtering within a layer of an artificial neural network according to another embodiment of the disclosure.

FIGS. 5 to 7 illustrate data filtering within a layer of an artificial neural network according to various embodiments of the disclosure. Hereinafter, the remaining parameters included in neural network structure information are described with reference to FIGS. 5 to 7.

FIG. 5 is a diagram illustrating data filtering within a layer of an artificial neural network according to an embodiment of the disclosure.

In FIG. 5, input data having a 4 by 4 size and a filter having a 2 by 2 size are described as examples of input data and a filter, for convenience of description. With reference to FIG. 5, in an operation within a convolutional layer, the sum may be calculated by multiplying input data and elements corresponding to each other between filters while moving the filters within the input data at a given interval, and may be outputted as an element of output data. In this case, the given interval at which the filters are moved is configured as a stride, and indicates a case where stride=1 in FIG. 5.

For example, an element (1,1) of output data may be calculated by multiplying elements disposed at (1,1), (1,2), (2,1), and (2,2) within input data corresponding to a filter having a 2 by 2 size and elements disposed at (1,1), (1,2), (2,1), and (2,2) of a filter, respectively, and then calculating the sum. Accordingly, the element (1,1) of the output data may be calculated as 0*0+1*1+1*1+2*2=6.

By using the same method as that described above, an element (1,2) of output data may be calculated by moving the filter by 1 (=stride) in an x axis direction (a right direction in the drawing), then multiplying elements disposed at (1,2), (1,3), (2,2), and (2,3) of the input data corresponding to the filter and elements disposed at the (1,1), (1,2), (2,1), and (2,2) of the filter, respectively, and then calculating the sum. Accordingly, an element (1,2) of output data may be calculated as 1*0+2*1+2*1+3*2=10. An element (3,3) of output data may be calculated as 1*0+0*1+0*1+3*2=6.

FIG. 6 is a diagram illustrating data filtering within a layer of an artificial neural network according to another embodiment of the disclosure.

FIG. 6 illustrates data filtering in a case where the same input data and filters as those in FIG. 5 are constructed, but a stride is configured to be different from that in FIG. 5. FIG. 5 illustrates an example if stride=1, and FIG. 6 illustrates an example if stride=2.

With reference to FIG. 6, an element (1,1) of output data may be calculated according to the same method as that in FIG. 5, and may be calculated as 0*0+1*1+1*2+2*2=6. An element (1,2) of output data may be calculated by moving a filter in an x axis direction (a right direction in the drawing) by 2 (=stride), then multiplying elements disposed at (1,3), (1,4), (2,3), and (2,4) of input data corresponding to the filter and elements disposed at (1,1), (1,2), (2,1), and (2,2) of the filter, respectively, and then calculating the sum. Accordingly, if stride=2 is indicated as in FIG. 6, the element (1,2) of the output data may be calculated as 2*0+3*1+3*1+0*2=6.

FIG. 7 is a diagram illustrating data filtering within a layer of an artificial neural network according to another embodiment of the disclosure.

FIG. 7 illustrates data filtering in a case where the same input data and filter as those in FIG. 5 are constructed, the same stride (stride=1) is configured, and padding is applied.

If input data is outputted by using a filter according to the method illustrated in FIG. 5, the size of output data is certainly reduced compared to the size of input data. Accordingly, the number of pieces of filtering which may be performed within a layer or the total number of layers may be limited. Furthermore, data disposed within the input data is repeatedly incorporated in a process of calculating each element of output data (e.g., data disposed in input data (2,2) in FIG. 5 is used in a process of calculating elements (1,1), (1,2), (2,1), and (2,2) within output data). In contrast, as data is closely disposed at an edge of the input data, the number of times that the data is incorporated in a filtering process may be reduced (e.g., data disposed at the input data (1,1) in FIG. 5 is incorporated only in a process of calculating the element (1,1) within output data). Accordingly, in order to adjust the size of output data and properly filter data disposed at an edge of input data, the edge of the input data may be extended by filling the surroundings of the edge with a specific value, and filtering may be then performed, which is called padding. FIG. 7 illustrates zero-padding in which the 4 by 4 input data described with reference to FIG. 5 has been extended by filling the surroundings of the edge with 0. With reference to FIG. 7, if padding is applied, filtering may be performed and output data may be calculated in the same manner as FIGS. 5 and 6 by using, as input data, data obtained by filling the surroundings of the edge of the original input data with a specific value.

Each of the values 0, 1, 1, and 2 of the elements included in the filter, which have been described with reference to FIGS. 5 to 7, corresponds to a weight of the artificial neural network. In the disclosure, the learning of an artificial neural network may mean that values of weights included in a filter are updated so that proper output data is outputted in accordance with input data. Each filter may be configured in each of a plurality of layers that construct an artificial neural network. A plurality of filters may be configured within the same layer.

According to an embodiment of the disclosure, the server 306 may perform the learning of the artificial neural network by using, as learning data, a wideband signal and a narrowband signal generated by down-sampling the wideband signal. That is, the server 306 may perform the learning of the artificial neural network by updating a filter or weight included in the artificial neural network so that the wideband signal, that is, an original waveform of the narrowband signal, is outputted from the down-sampled narrowband signal. The filter and weight of the learnt artificial neural network may be transmitted to the reception terminal 304 as neural network coefficient information.

Figure 8:
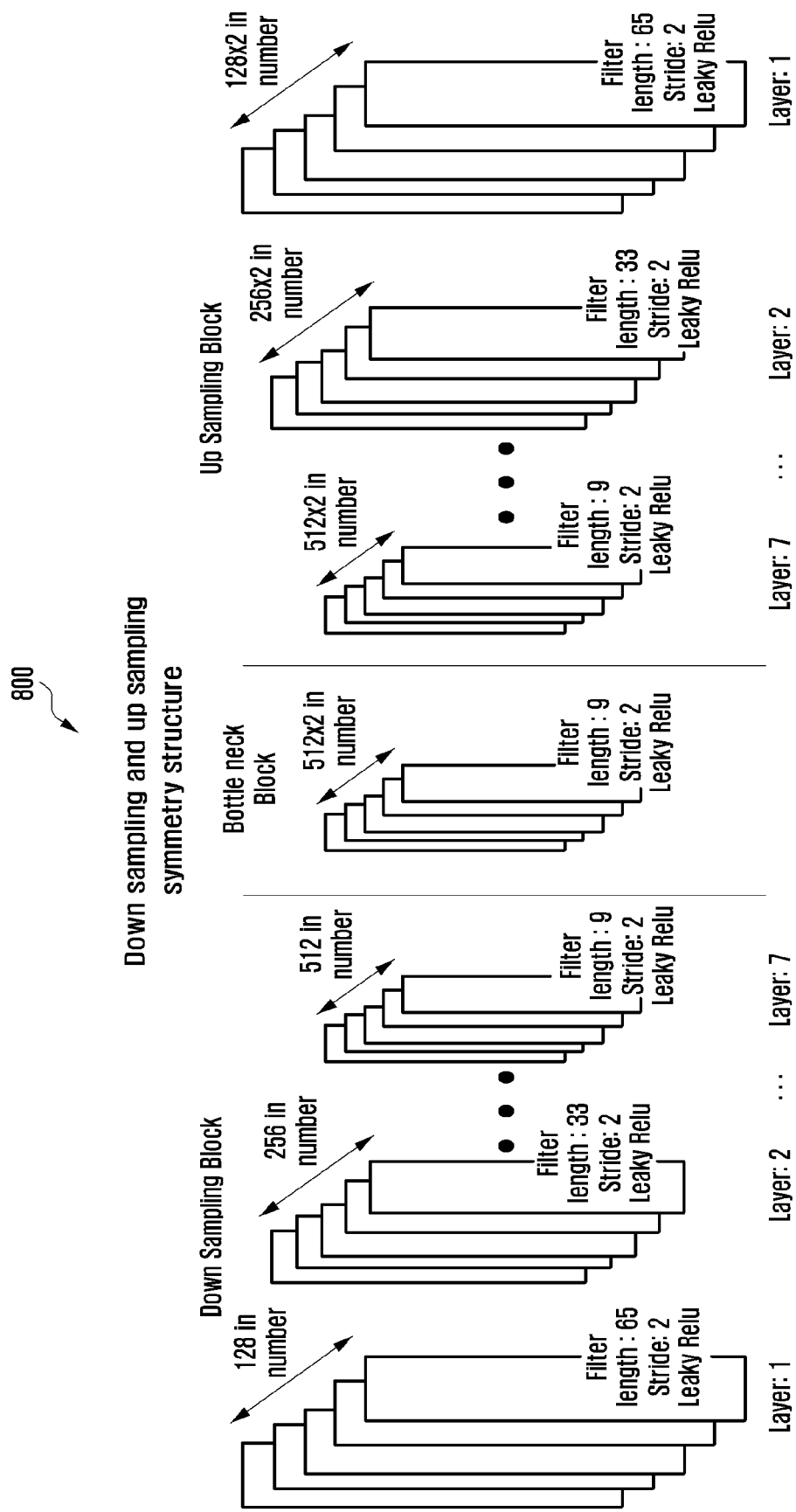
FIG. 8 is a diagram illustrating neural network structure information and a neural network structure corresponding to the neural network structure information according to an embodiment of the disclosure.

FIG. 8 is a diagram illustrating neural network structure information and a neural network structure corresponding to the neural network structure information according to an embodiment of the disclosure.

As described with reference to FIG. 3, a transmission terminal according to an embodiment of the disclosure may transmit, to a reception terminal, neural network structure information related to a learnt artificial neural network. The neural network structure information may include at least one of the number of layers L, the number of filters (N_filters) for each layer, the sizes of filters (N_filtersizes), an activation function, a stride, and padding.

Detailed values of the parameters corresponding to the neural network structure illustrated in FIG. 8 are as follows.

L=7
N_filters=[128, 516, 512, 512, 512, 512, 512]
N_filtersizes=[65, 33, 17, 9, 9, 9, 9]
activation function=2 (0: sigmoid, 1: Relu, 2: Leakyrelu)
Stride=2
padding=1 (0: zero padding, 1: same)

As illustrated in FIG. 8, an artificial neural network indicated by the parameters has seven layers of Layer 1 to Layer 7. Each of the seven layers may have 128 filters having a size 65, 256 filters having a size 33, 512 filters having a size 17, 512 filters having a size 9, . . . , 512 filters having a size 9. Furthermore, an activation function may be Leakyrelu, a sampling stride may be 2, and padding may be applied as the same value as a corresponding edge value. All the aforementioned values for indicating the parameters are for an example, and may be delivered as any form of information which may be recognized by a reception terminal.

Meanwhile, the learning process of the artificial neural network described with reference to FIGS. 3 to 7 may be performed based on voice information into which a characteristic of a person corresponding to each transmission terminal has been incorporated.

Figure 9:
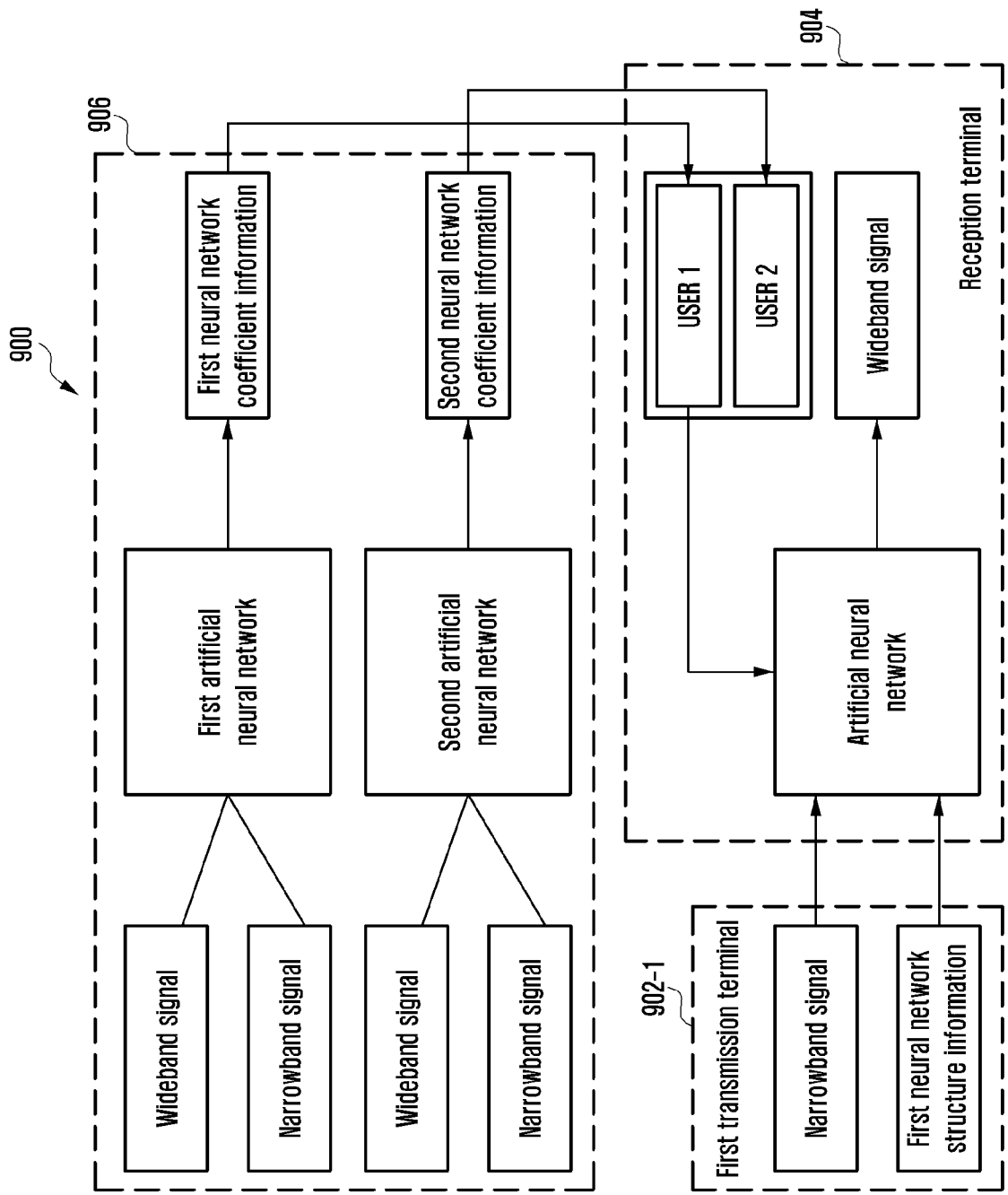
FIG. 9 is a diagram for describing a voice signal transmission and reception method based on an artificial neural network into which a characteristic of a person has been incorporated according to an embodiment of the disclosure.

FIG. 9 is a diagram for describing a voice signal transmission and reception method based on an artificial neural network into which a characteristic of a person has been incorporated according to an embodiment of the disclosure.

According to an embodiment, a server 906 may learn a first artificial neural network by using, as learning data, a wideband signal received from a first transmission terminal 902-1 and a narrowband signal corresponding to the wideband signal. Furthermore, the server 906 may learn a second artificial neural network by using, as learning data, a wideband signal received from a second transmission terminal (not illustrated) and a narrowband signal corresponding to the wideband signal. As also described with reference to FIG. 3, the server 906 may receive, from the first transmission terminal 902-1 and the second transmission terminal, a wideband signal and a narrowband signal corresponding to the wideband signal and learn each artificial neural network by using the wideband signal and the narrowband signal as learning data, or may receive a wideband signal from the first transmission terminal 902-1 and the second transmission terminal and the server 906 may down-sample the wideband signal as a narrowband signal and use the narrowband signal as learning data for learning each artificial neural network.

According to an embodiment, the server 906 may perform the learning of the first artificial neural network and the second artificial neural network based on first neural network structure information and second neural network structure information related to the first transmission terminal 902-1 and the second transmission terminal. The server 906 may receive, from the first transmission terminal 902-1 or the second transmission terminal, the first neural network structure information and the second neural network structure information related to the first transmission terminal 902-1 and the second transmission terminal, or the first neural network structure information and the second neural network structure information related to the first transmission terminal 902-1 and the second transmission terminal may be previously stored in the server 906 in accordance with the first transmission terminal 902-1 or the second transmission terminal, respectively. Neural network structure information according to an embodiment of the disclosure may include at least one of the number of layers constituting an artificial neural network, the number of filters for each layer, the sizes of filters for each layer, an activation function, a stride, and padding.

According to an embodiment, the server 906 may generate first neural network coefficient information related to the learnt first artificial neural network and second neural network coefficient information related to the second artificial neural network. The neural network coefficient information is a set of coefficients that constitute each of the learnt artificial neural networks, and may be a set including values that constitute weights of filters within layers that constitute each artificial neural network, for example. The server 906 may transmit the generated first neural network coefficient information and second neural network coefficient information to a reception terminal 904. The reception terminal 904 may store the received first and second neural network coefficient information in a storage device (e.g., a memory) of the reception terminal 904. According to an embodiment, the reception terminal 904 may store the received first neural network coefficient information and second neural network coefficient information by making the received first neural network coefficient information and second neural network coefficient information correspond to information of the first transmission terminal 902-1 and the second transmission terminal, which is stored in the reception terminal 904. For example, the received first neural network coefficient information and second neural network coefficient information may be stored in accordance with information of respective transmission terminals, which is stored in an address directory of the reception terminal.

According to an embodiment, the transmission of the first and second neural network coefficient information from the server 906 to the reception terminal 904 and the storage of the first and second neural network coefficient information in the reception terminal 904 accordingly may be performed before session negotiations between the first and second transmission terminals and the reception terminal 304 are performed.

Thereafter, the first transmission terminal 902-1 that attempts session negotiations may transmit, to the reception terminal 304, a narrowband signal down-sampled from a wideband signal generated based on first neural network structure information, including parameters related to a structure of the learnt first artificial neural network, and a voice inputted to the first transmission terminal 902-1. FIG. 9 illustrates that the first transmission terminal 902-1 initiates session negotiations and a call with the reception terminal 904, and is merely for an example. The same technical spirit may be applied to even a case where the second transmission terminal attempts session negotiations.

The reception terminal 904 may restore the first artificial neural network learnt by the server 906, based on the first neural network structure information received from the first transmission terminal 902-1 and the first neural network coefficient information previously stored in accordance with the information on the first transmission terminal 902-1. That is, the reception terminal 904 may restore the first artificial neural network by configuring coefficients included in the first neural network coefficient information that has been previously stored in the artificial neural network structure corresponding to the first neural network structure information received from the transmission terminal 902-1. The first artificial neural network has been learnt to restore a wideband signal, that is, an original waveform of a narrowband signal, from the narrowband signal by incorporating a characteristic of a voice inputted to the first transmission terminal 902-1 (e.g., a voice characteristic of a user of the first transmission terminal 902-1). Accordingly, the reception terminal 904 may restore, to the wideband signal, the narrowband signal received from the transmission terminal 902-1 by using the first artificial neural network.

Figure 10:
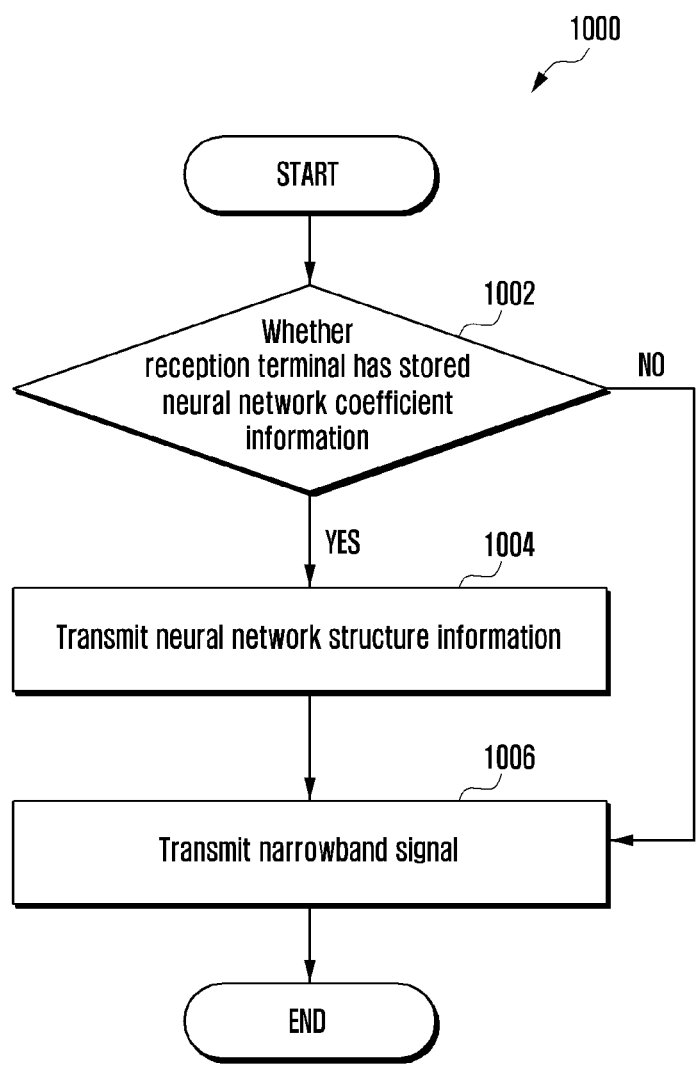
FIG. 10 is a diagram illustrating a method of transmitting, by a transmission terminal, a voice signal according to an embodiment of the disclosure.

FIG. 10 is a diagram illustrating a method of transmitting, by a transmission terminal, a voice signal according to an embodiment of the disclosure.

With reference to FIG. 10, a transmission terminal according to an embodiment of the disclosure may first identify whether a reception terminal, that is, the subject of session negotiations, has stored neural network coefficient information related to the transmission terminal (1002). If the reception terminal does not store the neural network coefficient information related to the transmission terminal, as in a conventional technology, the transmission terminal may generate a wideband signal based on an inputted voice, may generate a narrowband signal by down-sampling the wideband signal, and may transmit the generated narrowband signal to the reception terminal (1006). In this case, the reception terminal may restore the wideband signal by up-sampling the received narrowband signal through spline interpolation, etc. by using the same method as a conventional method. If the reception terminal stores the neural network coefficient information related to the transmission terminal, the transmission terminal may transmit, to the reception terminal, the neural network structure information related to the transmission terminal so that the reception terminal can restore a learnt artificial neural network (1004). Thereafter, the transmission terminal may generate a wideband signal based on an inputted voice, may generate a narrowband signal by down-sampling the wideband signal, and may transmit the generated narrowband signal to the reception terminal (1006). In this case, the reception terminal may restore an artificial neural network based on the neural network structure information received from the transmission terminal and the previously stored neural network coefficient information, and may restore, to the wideband signal, the narrowband signal received from the transmission terminal by using the artificial neural network. Neural network coefficient information according to an embodiment may be a set of coefficients that constitute an artificial neural network learnt in a server. The neural network structure information may include at least one of the number of layers constituting an artificial neural network, the number of filters for each layer, the sizes of filters for each layer, an activation function, a stride, and padding. The neural network structure information has been described with reference to the previous drawing, and a detailed description thereof is omitted.

Figure 11:
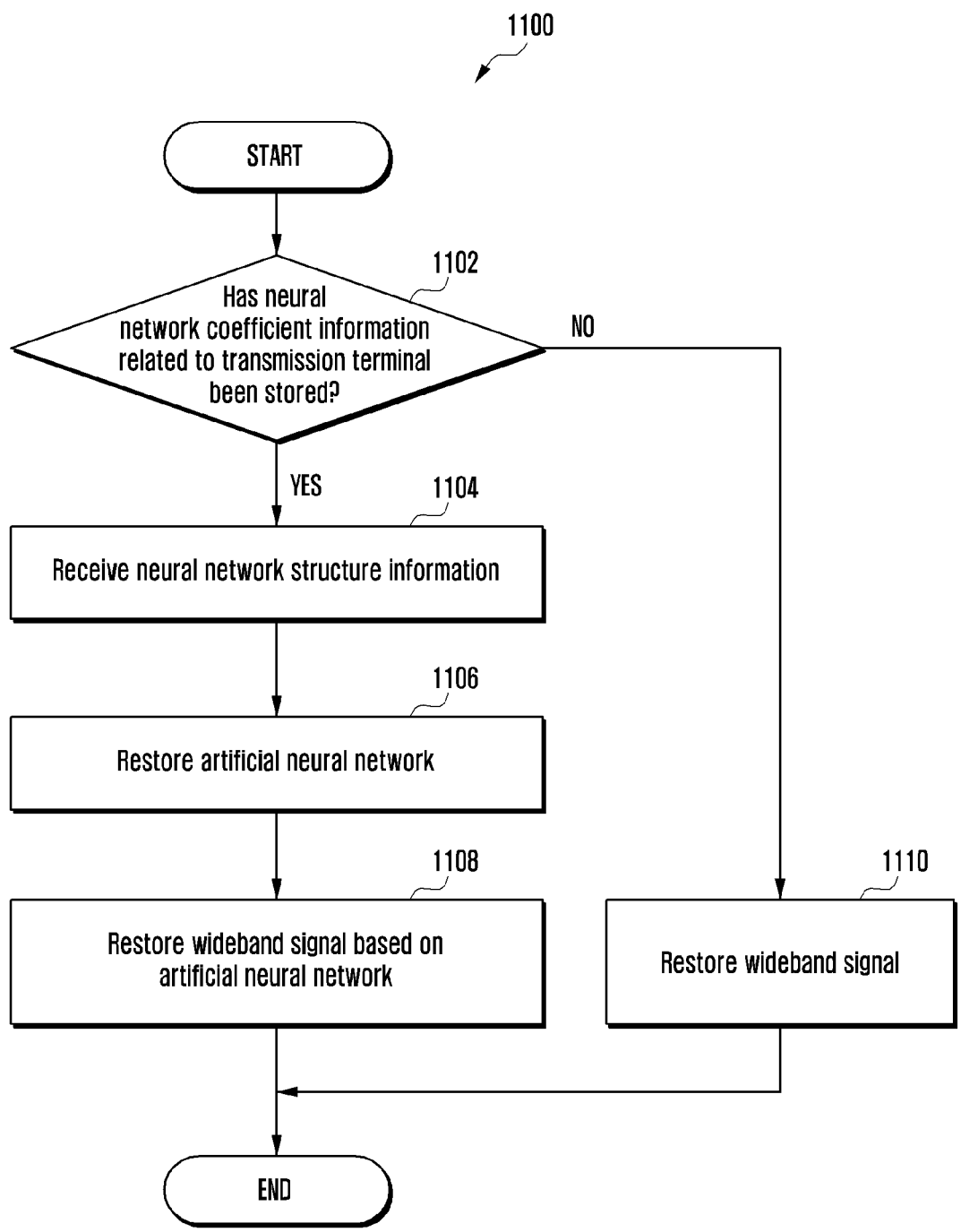
FIG. 11 is a diagram illustrating a method of receiving, by a reception terminal, a voice signal according to an embodiment of the disclosure.

FIG. 11 is a diagram illustrating a method of receiving, by a reception terminal, a voice signal according to an embodiment of the disclosure.

With reference to FIG. 11, a reception terminal according to an embodiment of the disclosure may identify whether the reception terminal has stored neural network coefficient information related to a transmission terminal, that is, the subject of session negotiations (1102). If the reception terminal does not store the neural network coefficient information related to the transmission terminal, the reception terminal may restore a wideband signal by up-sampling a narrowband signal received from the transmission terminal through spline interpolation, etc. by using the same method as a conventional method (1110). If the reception terminal stores the neural network coefficient information related to the transmission terminal, the reception terminal may receive, from the transmission terminal, neural network structure information for restoring an artificial neural network (1104). In this case, the reception terminal may restore the artificial neural network based on the neural network structure information received from the transmission terminal and the previously stored neural network coefficient information (1106), and may restore, to a wideband signal, a narrowband signal received from the transmission terminal (1108) by using the restored artificial neural network. Neural network coefficient information according to an embodiment may be a set of coefficients that constitute an artificial neural network learnt in a server. The neural network structure information may include at least one of the number of layers constituting an artificial neural network, the number of filters for each layer, the sizes of filters for each layer, an activation function, a stride, and padding. The neural network structure information has been described with reference to the previous drawing, and a detailed description thereof is omitted.

Figure 12:
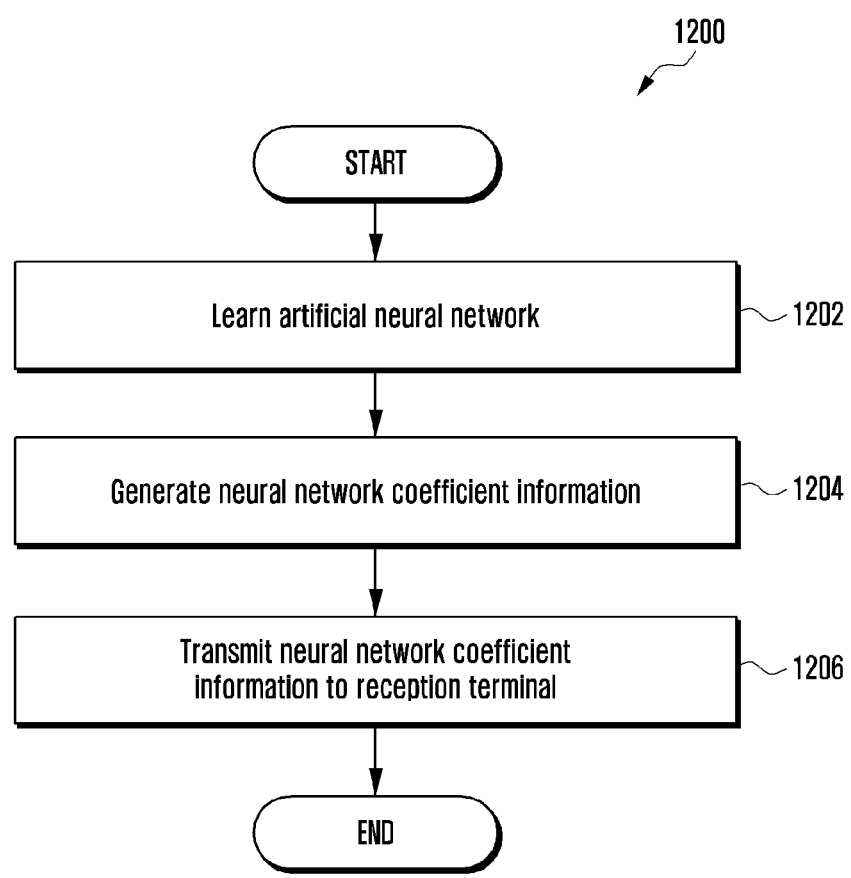
FIG. 12 is a diagram illustrating a method of a server according to an embodiment of the disclosure.

FIG. 12 is a diagram illustrating a method of a server according to an embodiment of the disclosure.

With reference to FIG. 12, a server according to an embodiment of the disclosure may perform the learning of an artificial neural network based on a wideband signal and a narrowband signal (1202). According to an embodiment, the server may receive, from a transmission terminal, the wideband signal or the narrowband signal to be used as learning data for the artificial neural network. The server may receive, from the transmission terminal, both the wideband signal and the narrowband signal corresponding to the wideband signal, or may receive the wideband signal from the transmission terminal and generate the narrowband signal by down-sampling the wideband signal. The server may perform the learning of the artificial neural network so that the wideband signal corresponding to an original waveform of the narrowband signal is restored from the narrowband signal down-sampled by using the wideband signal and the narrowband signal as learning data and is outputted. Thereafter, the server may generate neural network coefficient information related to the learnt artificial neural network (1204), and may transmit the neural network coefficient information to the reception terminal (1206).

According to an embodiment, a server may perform the learning of an artificial neural network by using a wideband signal and a narrowband signal as learning data based on neural network structure information related to a transmission terminal. The server may receive, from the transmission terminal, the neural network structure information related to the transmission terminal, or the neural network structure information related to the transmission terminal may be previously stored in the server in accordance with the transmission terminal. Furthermore, neural network coefficient information according to an embodiment of the disclosure may be a set of coefficients that constitute an artificial neural network learnt in a server. The neural network structure information may include at least one of the number of layers constituting an artificial neural network, the number of filters for each layer, the sizes of filters for each layer, an activation function, a stride, and padding. The neural network structure information has been described with reference to the previous drawing, and a detailed description thereof is omitted. According to an embodiment, the transmission of the neural network coefficient information from the server to the reception terminal and the storage of the neural network coefficient information in the reception terminal accordingly may be performed before session negotiations between the transmission terminal and the reception terminal are performed.

As described above, in this specification, the artificial neural network learning process has been described as being performed by a separated server, for convenience of description, but this does not restrict the scope of the disclosure. The artificial neural network learning process may be implemented by any apparatus capable of implementing the steps performed by the aforementioned server, for example, a terminal.

Figure 13:
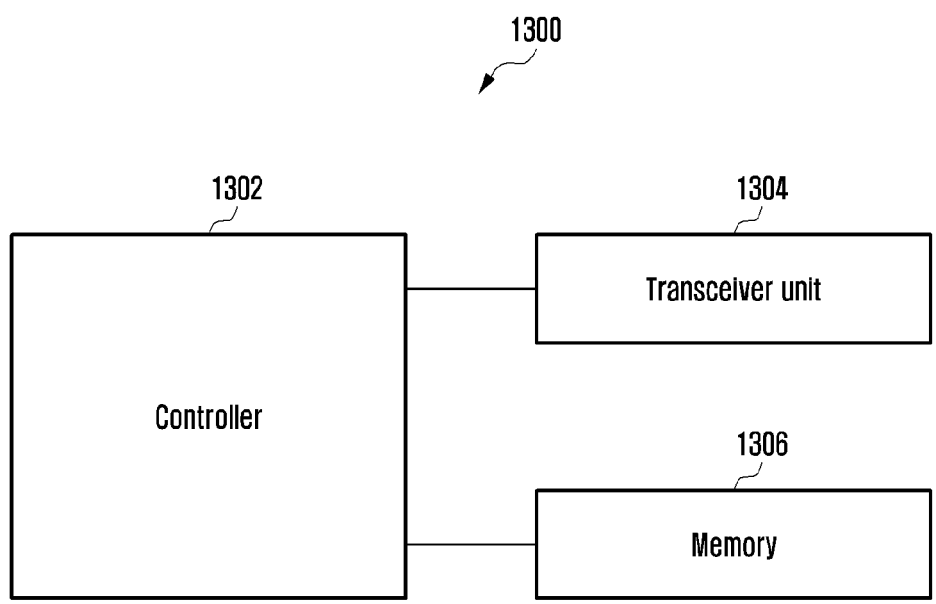
FIG. 13 is a diagram illustrating a construction of a transmission terminal according to an embodiment of the disclosure.

FIG. 13 is a diagram illustrating a construction of a transmission terminal 1300 according to an embodiment of the disclosure.

With reference to FIG. 13, a transmission terminal 1300 may include a controller 1302, a transceiver unit 1304, and a memory 1306. However, the components of the transmission terminal 1300 are not limited to the aforementioned example. For example, the transmission terminal 1300 may include more components or less components than the aforementioned components. Furthermore, the controller 1302, the transceiver unit 1304, and the memory 1306 may be implemented in one chip form.

According to an embodiment of the disclosure, the controller 1302 may control a series of processes on which the transmission terminal 1300 may operate according to the aforementioned embodiments of the disclosure. For example, the controller 1302 according to an embodiment of the disclosure may generate a wideband signal based on an inputted voice, may generate a narrowband signal by downsampling a voice signal, may perform the learning of an artificial neural network by using the generated wideband signal and narrowband signal as learning data, may generate neural network coefficient information and neural network structure information based on the learnt artificial neural network, and may control the transmission terminal 1300 to deliver or transmit the neural network coefficient information and neural network structure information to a reception terminal 1400. Furthermore, the controller 1302 according to an embodiment of the disclosure may control the transceiver unit 1304 and the memory 1306 so that the transceiver unit 1304 and the memory 1306 perform an operation necessary to perform an operation according to the aforementioned embodiments of the disclosure.

According to an embodiment of the disclosure, the transceiver unit 1304 may transmit and receive signals to and from the reception terminal 1400 or a server 1500. The aforementioned signal may include a voice signal and data.

According to an embodiment of the disclosure, the memory 1306 may store a program and data necessary for an operation of the terminal. Furthermore, the memory 1306 may store control information or data included in signals transmitted and received by the terminal. The memory 1306 may be constructed as a storage medium, such as a ROM, a RAM, a hard disk, a CD-ROM, and a DVD, or a combination of storage media. Furthermore, the memory 1306 may be constructed as a plurality of pieces of memory.

Figure 14:
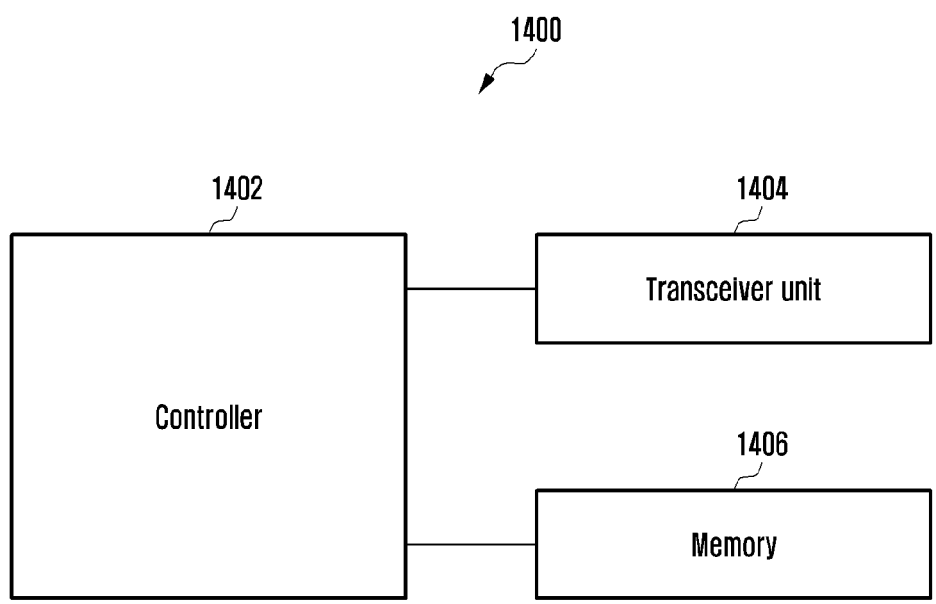
FIG. 14 is a diagram illustrating a construction of a reception terminal according to an embodiment of the disclosure.

FIG. 14 is a diagram illustrating a construction of a reception terminal 1400 according to an embodiment of the disclosure.

With reference to FIG. 14, the reception terminal 1400 may include a controller 1402, a transceiver unit 1404, and a memory 1406. However, the components of the reception terminal 1400 are not limited to the aforementioned example. For example, the reception terminal 1400 may include more components or less components than the aforementioned components. Furthermore, the controller 1402, the transceiver unit 1404, and the memory 1406 may be implemented in one chip form.

According to an embodiment of the disclosure, the controller 1402 may control a series of processes on which the reception terminal 1400 may operate according to the aforementioned embodiments of the disclosure. For example, the controller 1402 according to an embodiment of the disclosure may receive a narrowband signal from the transmission terminal 1300, may receive neural network coefficient information and neural network structure information, may restore an artificial neural network based on the received neural network coefficient information and neural network structure information, and may control the reception terminal 1400 to convert, into a wideband signal, a narrowband signal received from the transmission terminal 1300 by using the restored artificial neural network. Furthermore, the controller 1402 according to an embodiment of the disclosure may control the transceiver unit 1404 and the memory 1406 so that the transceiver unit 1404 and the memory 1406 perform an operation necessary to perform an operation according to the aforementioned embodiments of the disclosure.

According to an embodiment of the disclosure, the transceiver unit 1404 may transmit and receive signals to and from the transmission terminal 1300 or the server 1500. The aforementioned signal may include a voice signal and data.

According to an embodiment of the disclosure, the memory 1406 may store a program and data necessary for an operation of the terminal. Furthermore, the memory 1406 may store control information or data included in signals transmitted and received by the terminal. The memory 1406 may be constructed as a storage medium, such as a ROM, a RAM, a hard disk, a CD-ROM, and a DVD, or a combination of storage media. Furthermore, the memory 1406 may be constructed as a plurality of pieces of memory.

Figure 15:
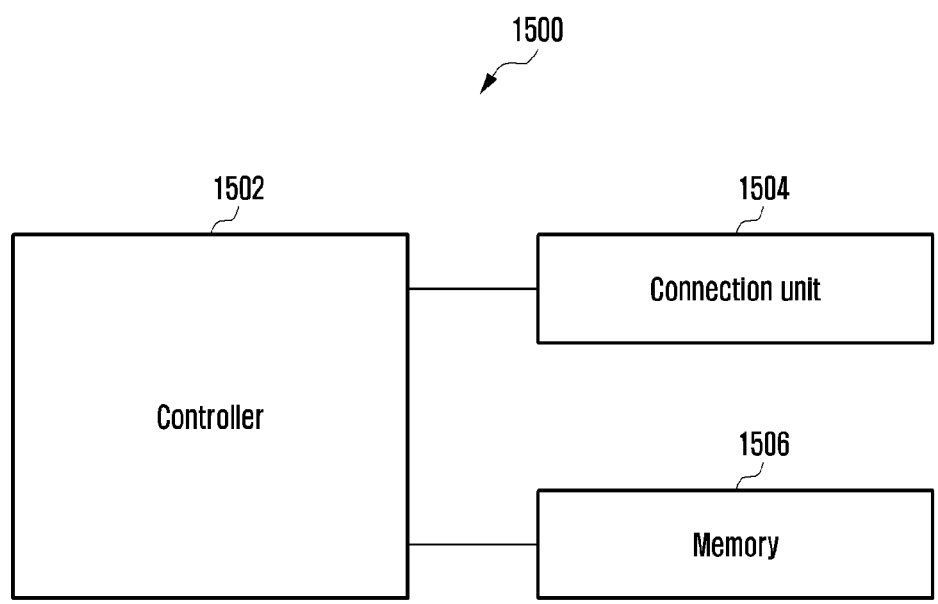
FIG. 15 is a diagram illustrating a construction of a server according to an embodiment of the disclosure.

FIG. 15 is a diagram illustrating a construction of a server according to an embodiment of the disclosure.

With reference to FIG. 15, a server 1500 may include a controller 1502, a connection unit 1504, and a memory 1506. However, the components of the server are not limited to the aforementioned example. For example, the server may include more components or less components than the aforementioned components. Furthermore, the controller 1502, the connection unit 1504, and the memory 1506 may be implemented in one chip form.

According to an embodiment of the disclosure, the controller 1502 may control a series of processes on which the server 1500 may operate according to the aforementioned embodiments of the disclosure. For example, the controller 1502 according to an embodiment of the disclosure may receive a signal from the transmission terminal 1300, may perform the learning of an artificial neural network, may generate neural network coefficient information, and may control the server 1500 to transmit the neural network coefficient information to the reception terminal 1400. Furthermore, the controller 1502 according to an embodiment of the disclosure may control the connection unit 1504 and the memory 1506 so that the connection unit 1504 and the memory 1506 perform an operation necessary to perform an operation according to the aforementioned embodiments of the disclosure.

According to an embodiment of the disclosure, the connection unit 1504 may be connected to a network entity that transmits and receives signals to and from the transmission terminal 1300 or the reception terminal 1400. The aforementioned signal may include a voice signal and data.

According to an embodiment of the disclosure, the memory 1506 may store a program and data necessary for an operation of the terminal. Furthermore, the memory 1506 may store control information or data included in signals transmitted and received by the terminal. The memory 1506 may be constructed as a storage medium, such as a ROM, a RAM, a hard disk, a CD-ROM, and a DVD, or a combination of storage media. Furthermore, the memory 1506 may be constructed as a plurality of pieces of memory.

Methods according to embodiments written in the claims or specification of the disclosure may be implemented in the form of hardware, software, or a combination of hardware and software.

If a method is implemented as software, a computer-readable storage medium or a computer program product which stores one or more programs (software modules) may be provided. The one or more programs stored in the computer-readable storage medium or the computer program product are configured for being executable by one or more processors within an electronic device. The one or more programs include instructions that enable the electronic device to execute methods according to embodiments, which are written in the claims or specification of the disclosure.

Such a program (software module or software) may be stored in a random access memory, a non-volatile memory including a flash memory, a read-only memory (ROM), an electrically erasable programmable read-only memory (EEPROM), a magnetic disc storage device, a compact disc-ROM (CD-ROM), digital versatile discs (DVDs) or other types of optical storage devices, or a magnetic cassette. Alternatively, the program (software module or software) may be stored in a memory consisting of a combination of all or some of them. Furthermore, multiple configuration memories may be included.

Furthermore, the program may be stored in an attachable storage device which may be accessed over a communication network, such as the Internet, Intranet, a local area network (LAN), a wide LAN (WLAN), or a storage area network (SAN), or a communication network consisting of a combination of them. Such a storage device may access a device that performs an embodiment of the disclosure through an external port. Furthermore, a separate storage device in a communication network may access a device that performs an embodiment of the disclosure.

In the aforementioned detailed embodiments of the disclosure, the components included in the disclosure have been expressed in the singular or plural form depending on a proposed detailed embodiment. However, the singular or plural expression has been selected suitably for a situation proposed for convenience of description, and the disclosure is not limited to singular or plural components. Although a component has been expressed in the plural form, it may be configured in the singular form. Although a component has been expressed in the singular form, it may be configured in the plural form.

Meanwhile, embodiments of the disclosure disclosed in this specification and the drawings have merely presented specific examples in order to easily describe technical contents of the disclosure and to help understanding of the disclosure, but are not intended to limit the scope of the disclosure. That is, it is evident to those skilled in the art to which the disclosure pertains that various other modified examples based on the technical spirit of the disclosure may be implemented. Furthermore, the embodiments may be combined and operated, if necessary. For example, a base station and a terminal may be operated by combining parts of one embodiment and another embodiment of the disclosure. Furthermore, embodiments of the disclosure may also be applied to other communication systems, and other modified examples based on the technical spirit of an embodiment may also be implemented. For example, the embodiments may also be applied to an LTE system, 5G, an NR system, etc.

The invention claimed is:

1. A method performed by a transmission terminal in a communication system, the method comprising:
   determining whether neural network coefficient information related to the transmission terminal is stored in a reception terminal;
   transmitting, to the reception terminal, neural network structure information related to the transmission terminal based on a determination that the neural network coefficient information is stored in the reception terminal;
   generating a wideband signal based on inputted voice;
   generating a narrowband signal by down-sampling the wideband signal; and
   transmitting, to the reception terminal, the narrowband signal.

2. The method of claim 1, wherein the neural network structure information comprises at least one of a number of layers, a number of filters included in each layer, a size of each of the filters included in each layer, an activation function, a stride, or padding.

3. A method performed by a reception terminal in a communication system, the method comprising:
   receiving neural network coefficient information from a server;
   receiving, from a transmission terminal, a narrowband signal and neural network structure information, wherein the neural network structure information is received based on the neural network coefficient information that is stored in the reception terminal;
   restoring an artificial neural network based on the neural network coefficient information and the neural network structure information; and
   converting the narrowband signal into a wideband signal based on the restored artificial neural network.

4. The method of claim 3, wherein the neural network structure information comprises at least one of a number of layers, a number of filters included in each layer, a size of each of the filters included in each layer, an activation function, a stride, or padding.

5. The method of claim 3, wherein the neural network coefficient information comprises a set of coefficients associated with the artificial neural network.

6. The method of claim 3, wherein the neural network coefficient information is received prior to session negotiations with the transmission terminal.

7. A method performed by a server in a communication system, the method comprising:
receiving, from a transmission terminal, one or more of a wideband signal and a narrowband signal;
performing a learning operation for an artificial neural network based on the wideband signal and the narrowband signal and neural network structure information received from the transmission terminal;
generating neural network coefficient information related to the artificial neural network; and
transmitting the neural network coefficient information to a reception terminal.

8. The method of claim 7, wherein:
the neural network structure information comprises at least one of a number of layers, a number of filters included in each layer, a size of each of the filters included in each layer, an activation function, a stride, or padding.

9. The method of claim 7, wherein the neural network coefficient information is transmitted to the reception terminal prior to session negotiations between the transmission terminal and the reception terminal.

10. A transmission terminal in a communication system, the transmission terminal comprising:
a transceiver; and
a processor operably coupled to the transceiver and configured to:
determine whether neural network coefficient information related to the transmission terminal is stored in a reception terminal;
transmit, to the reception terminal, neural network structure information related to the transmission terminal based on a determination that the neural network coefficient information is stored in the reception terminal;
generate a wideband signal based on inputted voice;
generate a narrowband signal by down-sampling the wideband signal; and
transmit, to the reception terminal, the narrowband signal.

11. The transmission terminal of claim 10, wherein the neural network structure information comprises at least one of a number of layers, a number of filters included in each layer, a size of each of the filters included in each layer, an activation function, a stride, or padding.

12. A reception terminal in a communication system, the reception terminal comprising:
a transceiver; and
a processor operably coupled to the transceiver and configured to:
receive neural network coefficient information from a server;
receive, from a transmission terminal, a narrowband signal and neural network structure information, wherein the neural network structure information is received based on the neural network coefficient information that is stored in the reception terminal;
restore an artificial neural network based on the neural network coefficient information and the neural network structure information; and
convert the narrowband signal into a wideband signal based on the restored artificial neural network.

13. The reception terminal of claim 12, wherein:
the neural network structure information comprises at least one of a number of layers, a number of filters included in each layer, a size of each of the filters included in each layer, an activation function, a stride, or padding,
the neural network coefficient information comprises a set of coefficients associated with the artificial neural network, and
the processor is further configured to receive, from the server, the neural network coefficient information prior to session negotiations with the transmission terminal.

14. A server communicating with a terminal transmitting and receiving voice signals, the server comprising:
a connection circuit; and
a processor operably coupled to the connection circuit and configured to:
receive, from a transmission terminal, one or more of a wideband signal and a narrowband signal;
perform a learning operation for an artificial neural network based on the wideband signal and the narrowband signal and neural network structure information received from the transmission terminal;
generate neural network coefficient information related to the artificial neural network; and
transmit the neural network coefficient information to a reception terminal.

15. The server of claim 14, wherein the neural network structure information comprises at least one of a number of layers, a number of filters included in each layer, a size of each of the filters included in each layer, an activation function, a stride, or padding.

16. The server of claim 14, wherein the neural network coefficient information is transmitted to the reception terminal prior to session negotiations between the transmission terminal and the reception terminal.

* * * * *